United States Patent
Gerdin et al.

(10) Patent No.: US 10,171,143 B2
(45) Date of Patent: Jan. 1, 2019

(54) MICROWAVE RADIO TRANSMITTER AND RECEIVER FOR POLARIZATION MISALIGNMENT COMPENSATION

(71) Applicant: Telefonaktiebolaget LM Ericsson (publ), Stockholm (SE)

(72) Inventors: Markus Gerdin, Nödinge (SE); Björn Gävert, Göteborg (SE); Göran Nilsson, Hisings Backa (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/547,552

(22) PCT Filed: Feb. 12, 2015

(86) PCT No.: PCT/EP2015/053035
§ 371 (c)(1),
(2) Date: Jul. 31, 2017

(87) PCT Pub. No.: WO2016/128061
PCT Pub. Date: Aug. 18, 2016

(65) Prior Publication Data
US 2018/0026686 A1   Jan. 25, 2018

(51) Int. Cl.
H04B 1/00      (2006.01)
H04B 17/00    (2015.01)
H04B 7/0456  (2017.01)
H04B 7/10      (2017.01)
(Continued)

(52) U.S. Cl.
CPC .......... *H04B 7/0469* (2013.01); *H04B 7/002* (2013.01); *H04B 7/10* (2013.01); *H04B 17/12* (2015.01)

(58) Field of Classification Search
CPC .......... H04B 7/04; H04B 7/0469; H04B 7/10; H04B 10/60; H04B 10/532; H04B 10/614; H04B 17/12
USPC ....... 455/63.1, 63.4, 67.11, 67.13, 69, 226.1, 455/226.4
See application file for complete search history.

(56) References Cited

U.S. PATENT DOCUMENTS

| | | | |
|---|---|---|---|
| 6,546,236 B1 * | 4/2003 | Canada | H04B 7/10 455/276.1 |
| 7,965,993 B2 * | 6/2011 | Lindgren | H04B 7/10 455/226.1 |
| 8,649,747 B1 | 2/2014 | Emmanuel et al. | |

(Continued)

*Primary Examiner* — Quochien B Vuong
(74) *Attorney, Agent, or Firm* — Coats & Bennett, PLLC

(57) ABSTRACT

This disclosure provides a microwave radio transmitter for radio transmission to a microwave radio receiver. The microwave radio transmitter comprises an antenna arrangement and a baseband processing module connected to the antenna arrangement. The antenna arrangement comprises an antenna having a polarization. The baseband processing module is configured to receive a polarization misalignment indication from the microwave radio receiver. The polarization misalignment indication is indicative of a misalignment between the polarization of the antenna and a corresponding polarization of a receive antenna comprised in the microwave radio receiver. The baseband processing module is configured to compensate for polarization misalignment between the antenna and the receive antenna by adjusting the radio transmission based on the polarization misalignment indication.

25 Claims, 8 Drawing Sheets

(51) Int. Cl.
    *H04B 7/00*        (2006.01)
    *H04B 17/12*      (2015.01)

(56) References Cited

U.S. PATENT DOCUMENTS

| | | | | |
|---|---|---|---|---|
| 8,954,023 | B2* | 2/2015 | Hillstrom | H01Q 21/245 |
| | | | | 455/226.3 |
| 9,686,070 | B2* | 6/2017 | Bowers | H04L 27/04 |
| 2013/0279631 | A1 | 10/2013 | Bowers et al. | |
| 2013/0331039 | A1 | 12/2013 | Hillstrom et al. | |
| 2016/0173149 | A1* | 6/2016 | Ling | H01Q 3/40 |
| | | | | 375/346 |

* cited by examiner

```
┌─────────────────────────────────────────┐
│     SX200: Receiving a signal module    │
└─────────────────────────────────────────┘

┌───────────────────────────────────────────────────────────────────┐
│ SX201: determining polarization misalignment indication module    │
│                                                                   │
│  ┌─ ─ ─ ─ ─ ─ ─ ─ ─ ─ ┐    ┌─ ─ ─ ─ ─ ─ ─ ─ ─ ─ ─ ─ ┐             │
│  │   SX2011: Measuring │    │ SX2013: Receiving second signal │   │
│  │ received power module│   │            module             │     │
│  └─ ─ ─ ─ ─ ─ ─ ─ ─ ─ ┘    └─ ─ ─ ─ ─ ─ ─ ─ ─ ─ ─ ─ ┘             │
│  ┌─ ─ ─ ─ ─ ─ ─ ─ ─ ─ ┐    ┌─ ─ ─ ─ ─ ─ ─ ─ ─ ─ ─ ─ ┐             │
│  │  SX2012: Power-based │   │    SX2014: Estimating cross- │      │
│  │ determining polarization│ │       correlation module    │      │
│  │ misalignment indication │ └─ ─ ─ ─ ─ ─ ─ ─ ─ ─ ─ ─ ┘            │
│  │        module         │  ┌─ ─ ─ ─ ─ ─ ─ ─ ─ ─ ─ ─ ┐             │
│  │                       │  │ SX2015: Cross-correlation-based │   │
│  └─ ─ ─ ─ ─ ─ ─ ─ ─ ─ ┘    │      determining polarization    │   │
│                            │   misalignment indication module │   │
│                            └─ ─ ─ ─ ─ ─ ─ ─ ─ ─ ─ ─ ┘             │
└───────────────────────────────────────────────────────────────────┘

┌─────────────────────────────────────────┐
│    SX202: Transmitting polarization     │
│     misalignment indication module      │    800
└─────────────────────────────────────────┘

┌─ ─ ─ ─ ─ ─ ─ ─ ─ ─ ─ ─ ─ ─ ─ ─ ─ ─ ─ ─ ─ ─ ─ ─ ─ ─ ┐
│ SX203:Polarization misalignment compensating       │
│                   module                            │
│  ┌─ ─ ─ ─ ─ ─ ─ ─ ─ ─ ─ ─ ─ ─ ─ ─ ─ ─ ─ ─ ─ ─ ┐    │
│  │ SX203a: Adjusting the received signal module │   │
│  │  ┌─ ─ ─ ─ ─ ─ ─ ─ ─ ─ ─ ─ ─ ─ ─ ─ ─ ─ ─ ┐   │   │
│  │  │ SX203b: Processing the received signal │  │   │
│  │  │                module                  │  │   │
│  │  └─ ─ ─ ─ ─ ─ ─ ─ ─ ─ ─ ─ ─ ─ ─ ─ ─ ─ ─ ┘   │   │
│  └─ ─ ─ ─ ─ ─ ─ ─ ─ ─ ─ ─ ─ ─ ─ ─ ─ ─ ─ ─ ─ ─ ┘    │
└─ ─ ─ ─ ─ ─ ─ ─ ─ ─ ─ ─ ─ ─ ─ ─ ─ ─ ─ ─ ─ ─ ─ ─ ─ ─ ┘
```

Fig. 8

MICROWAVE RADIO TRANSMITTER AND RECEIVER FOR POLARIZATION MISALIGNMENT COMPENSATION

The present disclosure relates to radio transmitters and radio systems and in particular to polarization misalignment compensation at a microwave radio transmitter and/or at a microwave radio receiver.

BACKGROUND

To improve spectral efficiency in radio transmission (e.g. for a microwave radio link), radio transmission can be performed using orthogonal polarizations. To optimize the use of orthogonal polarizations in radio transmission, it is important that information, or signal energy, does not leak between the two polarizations, i.e. that the polarizations do not mutually interfere. To limit such leakage, the transmit antenna and the receive antennas need to be aligned (rotation-wise) so that a signal transmitted on a first polarization at the transmitter is only, or mostly, received on a corresponding first polarization at the receiver and not on an second polarization at the receiver.

Should some signal energy leak between polarizations, a cancellation of this leakage can be done at a receiver. This cancellation of polarization leakage is sometimes referred to as cross-polarization interference cancellation, XPIC. However, during XPIC, some of the main or wanted signal energy may be lost, and hence polarization leakage may still occur which is not desired.

To align the transmit and receive antennas in polarization, it is typically necessary for an installation person, to manually rotate the misaligned antenna at one end of the communication channel using feedback from another installation person, at the other end of the communication channel. Antennas are usually mounted high up in masts and/or in remote locations. Thus, such a solution is cumbersome and time-consuming. Such a solution also requires designing and providing a mounting arrangement for the antennas that allows mechanical rotation of the antennas, which also increases the cost of the antennas.

Thus, there is a need for a technique addressing at least partly the problems stated above without requiring manual intervention.

SUMMARY

An object of the present disclosure is to provide microwave radio transmitter apparatuses, microwave radio receiver apparatuses, network nodes, and methods which seek to mitigate, alleviate, or eliminate one or more of the above-identified deficiencies in the art and disadvantages singly or in any combination.

This object is obtained by a microwave radio transmitter for radio transmission to a microwave radio receiver. The microwave radio transmitter comprises an antenna arrangement and a baseband processing module connected to the antenna arrangement. The antenna arrangement comprises an antenna having a polarization. The baseband processing module is configured to receive a polarization misalignment indication from the microwave radio receiver. The polarization misalignment indication is indicative of a misalignment between the polarization of the antenna and a corresponding polarization of a receive antenna comprised in the microwave radio receiver. The baseband processing module is configured to compensate for polarization misalignment between the antenna and the receive antenna by adjusting the radio transmission based on the polarization misalignment indication.

Hereby, the present disclosure provides for polarization alignment between transmit and corresponding receive antennas by adjusting the radio transmission based on the polarization misalignment indication, without a need for mechanically adjusting antenna installations. This disclosure thus alleviates signal leakage between polarizations even when the actual antenna polarizations are misaligned, i.e. when the polarization of the transmit antenna does not agree fully with the polarization of the corresponding receive antenna. Hence, the proposed technique permits to maintain performance improvements provided by the orthogonal polarizations, such as improved spectral efficiency and improved throughput in comparison to a communication based on a single polarization.

This disclosure provides a polarization alignment with no on-site manual intervention necessary. The polarization misalignments can thus be corrected more often than for solutions requiring on-site manual intervention. The polarization misalignments can even be continuously or periodically estimated and compensated for, e.g. at misalignment detections.

According to some other aspects, the antenna is a first antenna having a first polarization, and the antenna arrangement further comprises a second antenna having a second polarization. Herein, it is assumed that the second polarization is different from the first polarization, although not necessarily orthogonal to the first polarization.

According to some other aspects, the baseband processing module is configured to receive from the microwave radio receiver a polarization misalignment indication indicative of a misalignment between the second polarization and a corresponding polarization of a second receive antenna comprised in the microwave radio receiver.

Hereby, the present disclosure further enables the microwave radio transmitter to process a first polarization misalignment indication (indicative of a misalignment between the first polarization and a corresponding first polarization at the receiver) and a second polarization misalignment indication (indicative of a misalignment between the second polarization and a corresponding second polarization at the receive) to e.g. average them out. The microwave radio transmitter is therefore able to derive an improved polarization misalignment indication. Furthermore, enabling the reception of two polarization misalignment indications provides robustness in case of a failure of one of the polarizations.

This object is further obtained by a microwave radio receiver for reception of radio transmission from a microwave radio transmitter. The microwave radio receiver comprises an antenna arrangement and a baseband processing module connected to the antenna arrangement. The antenna arrangement comprises an antenna having a polarization. The antenna is configured to receive a signal from the microwave radio transmitter. The baseband processing module is configured to determine a polarization misalignment indication based on the received signal. The polarization misalignment indication is indicative of a misalignment between the polarization of the antenna and a corresponding polarization of a transmit antenna comprised in the microwave radio transmitter. The antenna arrangement is configured to transmit the polarization misalignment indication to the microwave radio transmitter.

Hereby, the present disclosure provides a simplified hardware for the microwave radio receiver as it allows performing compensation for polarization misalignment at the microwave radio transmitter based on the polarization misalignment indication transmitted by the microwave radio receiver. Enabling polarization misalignment compensation at the transmitter also overcomes any complexity that may be introduced by impairments of the wireless communication channel in the compensation process.

There is also disclosed herein a network node for microwave radio communications comprising a microwave radio transmitter apparatus according to some aspects of this disclosure.

There is also disclosed herein a network node for microwave radio communications comprising a microwave radio receiver apparatus according to some aspects of this disclosure.

This disclosure also relates to a method, performed in a microwave radio transmitter, for radio transmissions to a microwave radio receiver. The microwave radio transmitter comprises an antenna arrangement and a baseband processing module connected to the antenna arrangement. The antenna arrangement comprises an antenna having a polarization. The method comprises receiving a polarization misalignment indication from the microwave radio receiver. The polarization misalignment indication is indicative of a misalignment between the polarization and a corresponding polarization of a receive antenna comprised in the microwave radio receiver. The method comprises compensating for polarization misalignment between the antenna and the receive antenna by adjusting the radio transmission based on the polarization misalignment indication.

In addition to the above method, there is also provided herein computer programs comprising computer program code which, when executed in a microwave radio transmitter apparatus, causes the microwave radio transmitter apparatus, to execute methods according to the present disclosure.

This disclosure also relates to a method, performed in a microwave radio receiver, for reception of radio transmission from a microwave radio transmitter. The microwave radio receiver comprises an antenna arrangement and a baseband processing module connected to the antenna arrangement. The antenna arrangement comprises an antenna having a polarization. The method comprises receiving a signal from a microwave radio transmitter on the antenna. The method comprises determining a polarization misalignment indication based on the received signal. The polarization misalignment indication is indicative of a misalignment between the polarization and a corresponding polarization of a transmit antenna comprised in the microwave radio transmitter. The method comprises transmitting the polarization misalignment indication to the microwave radio transmitter.

Furthermore, there is provided herein computer programs comprising computer program code which, when executed in a microwave radio receiver, causes the microwave radio receiver, to execute methods according to the present disclosure.

The computer programs, the methods, and the network nodes, provide advantages corresponding to the advantages already described in relation to the microwave radio transmitters, and the microwave radio receivers respectively.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 8 is a block diagram illustrating a microwave radio receiver according to some aspects of the present disclosure.

DETAILED DESCRIPTION

Figure 1:
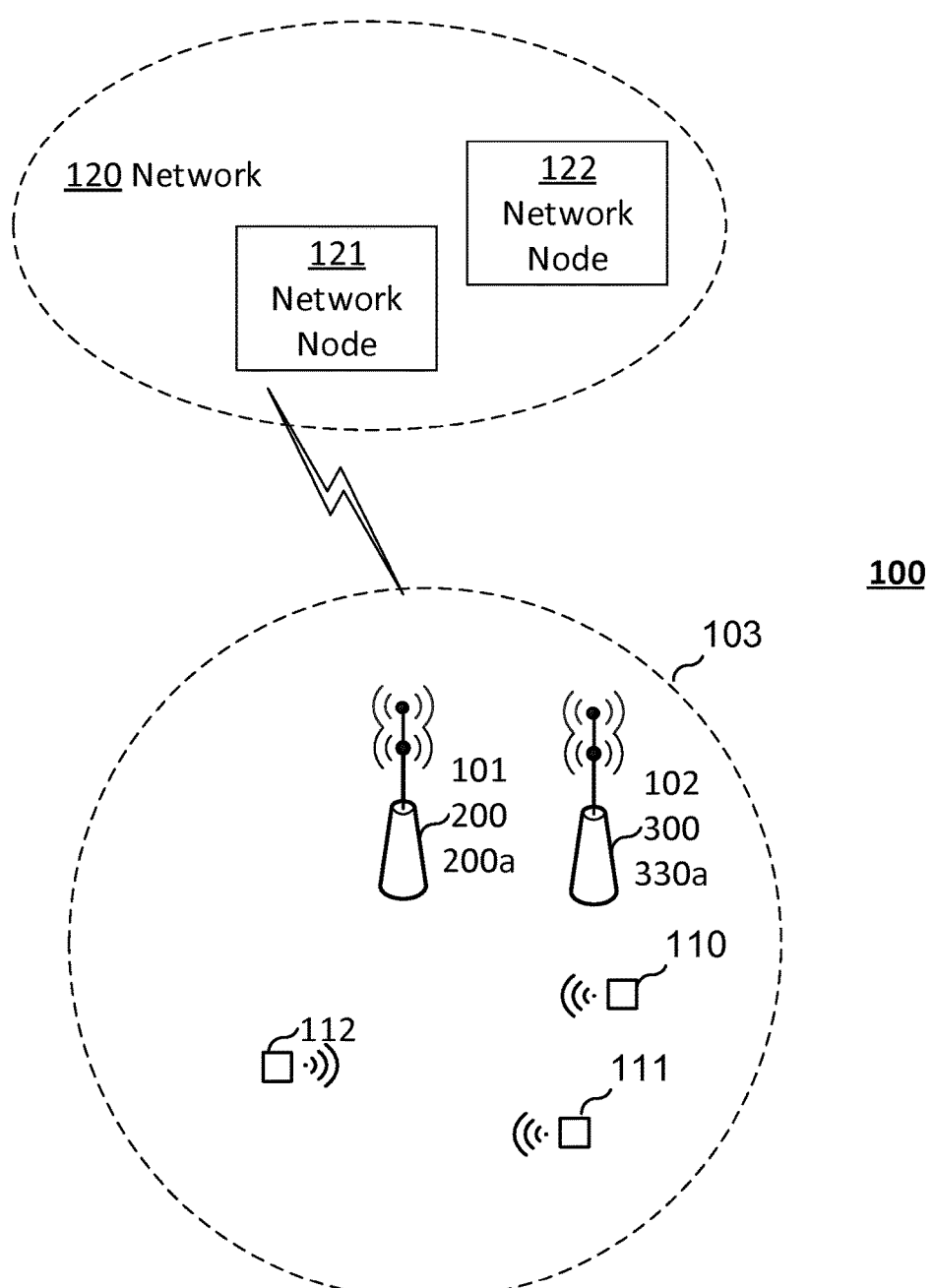
FIG. 1 is a wireless communication system according to some aspects of the present disclosure and a network node according to aspects of this disclosure.

The present teaching relates to mitigating polarization misalignment affecting microwave radio communications. The present technique is applicable to any radio communication apparatus or system where signals can be affected by polarization misalignment.

The various apparatuses are according to different aspects implemented at least partly by, e.g., application-specific integrated circuit, ASIC, a field-programmable logic array, FPGA, or general purpose processor.

As mentioned in the background section, cross-polarization interference is an issue in microwave radio communications and especially in a multiple polarization setting. In a multiple polarization setting, a microwave radio transmitter transmits at the same frequency, and at the same time, a first signal using a first polarization and a second signal using a second polarization. To improve spectral efficiency, the second polarization is adjusted to be orthogonal to the first polarization. By using orthogonal polarizations (e.g. vertical polarization and horizontal polarization) in the same frequency band, the transmission capacity can be doubled in comparison to a transmission with a single polarization. The first signal is to be received at a microwave radio receiver using a corresponding first polarization while the second signal is to be received at a microwave radio receiver using a corresponding second polarization. However, if the first polarization used to transmit the first signal is not aligned with the corresponding first polarization used to receive the first signal, due to a strong wind that has caused the antennas to tilt or due to propagation effects, such as rain, in the radio channel which have polarization altering effects, the first signal transmission would create interferences on the second signal reception and consequently polarization orthogonality would not be achieved. Thus a polarization misalignment such as that discussed above can result in a performance degradation of the microwave radio communication. This performance degradation can be, e.g., in terms of degraded signal to interference and noise ratio, SINR, degraded bit error rate, BER, degraded frame error rate, FER.

The present disclosure aims at alleviating such degradations created by polarization misalignment between a microwave radio transmitter and a microwave radio receiver. To reduce or cancel such degradations, the polarization used for transmission has to be aligned with a corresponding polarization used for reception at a microwave radio receiver.

An account of techniques for mitigating polarization misalignment without need for manual intervention by an installation person will now be given, followed by an account of the proposed technique.

Multiple polarization settings usually involve a multiple antenna setting, where each antenna has a polarization. However, it may also involve a setting with a dual polarized single antenna. To align the transmit and receive polarization, it is typically necessary for an installation person to correct the polarization misalignment by manually rotating the antenna at one end of the communication channel using feedback from another installation person at the other end of the communication channel. As antennas are usually mounted high up in a mast and/or in a remote location, such a solution requires an on-site intervention from installation persons which is cumbersome and time-consuming. Also, such solution requires designing a mounting arrangement of the antennas that allows mechanical rotation of the antennas. However, this increases a cost of the antennas. Moreover, this does not allow for continuous estimation and compensation of polarization misalignment to be performed e.g. periodically, or at each misalignment detection.

Now an account of the current proposed technique for phase alignment will be given. As noted above, the existing techniques present many limitations. It is therefore herein proposed to correct the polarization misalignment in the digital domain instead of manually rotating antennas. To do this, the microwave radio transmitter receives a polarization misalignment indication from the microwave radio receiver. The polarization misalignment indication is e.g. an angular estimate indicative of a misalignment angle between the polarization of the antenna at the microwave radio transmitter and a corresponding polarization of a receive antenna comprised in the microwave radio receiver, and/or a polarization misalignment presence indication, and/or a misalignment direction indicator. The angular estimate is expressed for example in degrees with a sign indicating the direction in which the angle is measured with respect to a reference, thus the direction in which the compensation should be performed. The misalignment presence indication indicates if misalignment exists between two polarizations. The misalignment direction indicator is a sign ("+" or "−") indicating in which direction the polarization is to be rotated. The microwave radio transmitter compensates for the polarization misalignment between its antenna and the receive antenna by adjusting in its baseband part the radio transmission based on the polarization misalignment indication.

In other words, the microwave radio transmitter compensates for polarization misalignment by digitally rotating the signals in its baseband part (i.e. around Direct Current, DC, before a radio frequency, RF, part). This minimizes leakage between signals transmitted across polarizations even when the actual physical polarizations of the transmit antenna and corresponding receive antennas are misaligned. Hence, the proposed technique permits to maintain performance improvements provided by the orthogonal polarizations, such as an improved spectral efficiency and an improved throughput compared to a communication based on a single polarization.

This disclosure provides a polarization alignment with no on-site manual intervention necessary. The polarization misalignments can thus be corrected remotely, "automatically", and more often than for solutions requiring on-site manual intervention. The polarization misalignments can even be continuously estimated and compensated for, e.g. at each misalignment detection, or periodically.

Aspects of the present disclosure will be described more fully hereinafter with reference to the accompanying drawings. The microwave radio transmitter apparatus, the network node, the radio system, and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the proposed technique. As used herein, the singular forms "a", "an" and "the" are intended to include the plural forms as well, unless the context clearly indicates otherwise.

FIG. 1 shows a wireless communication system 100 where a microwave radio transmitter 101, 200, 200a according to some aspects of the present disclosure, a microwave radio receiver 102, 300, 300a according to some aspects, a network node 121 according to this disclosure and a network node 122 according to this disclosure may be implemented. The wireless communication system 100 comprises a microwave radio transmitter 101, 200, 200a according to aspects of this disclosure and a microwave radio receiver 102, 300, 300a according to aspects of this disclosure. The microwave radio transmitter 101, 200, 200a is configured to transmit signals to any of microwave radio receiver apparatuses 102, 300, 300a, such as in a coverage area 103. The wireless communication system 100 also includes e.g. wireless devices 110, 111, and 112.

The network node 121 for microwave radio communications comprises a microwave radio transmitter apparatus according to some aspects of this disclosure. The network node 122 comprises a microwave radio receiver according to some aspects of this disclosure. The network node 121, 122 comprises e.g. a backhaul radio link equipment, a microwave radio relay. The network node 121, 122 communicates via a network 120.

Figure 2:
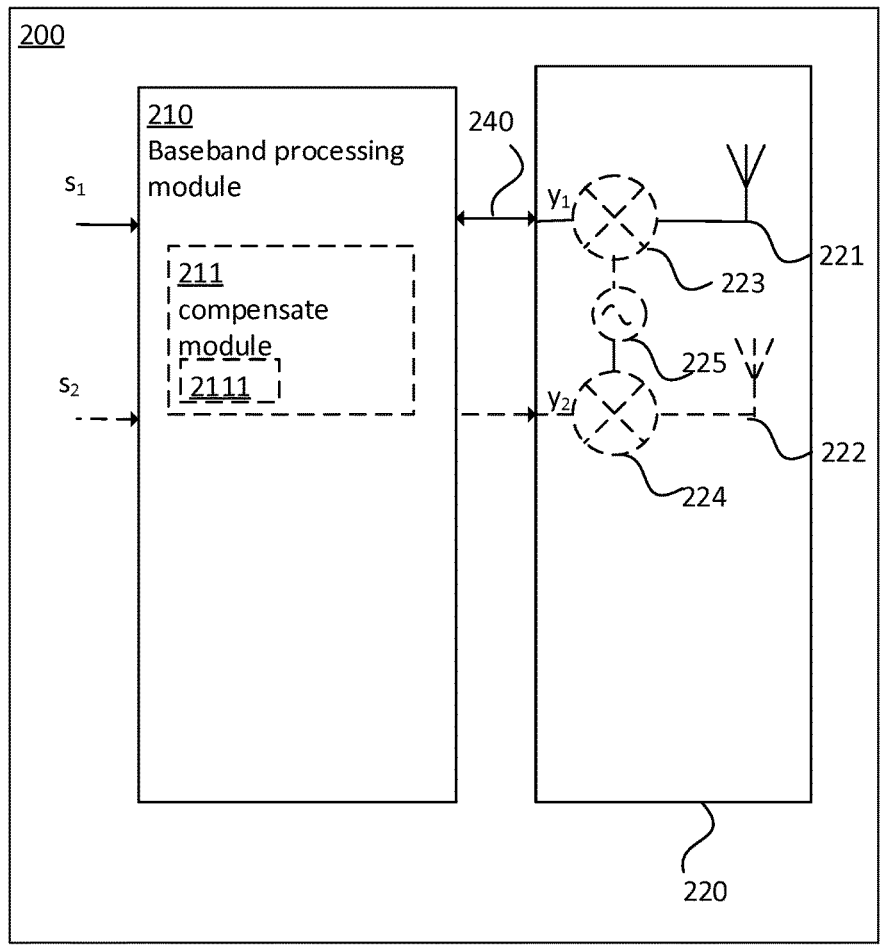
FIG. 2 is a block diagram illustrating a microwave radio transmitter according to some aspects of the present disclosure.

FIG. 2 is a block diagram illustrating aspects of a microwave radio transmitter 200. The microwave radio transmitter 200 operates in microwave frequencies, such as frequencies between 3 GHz and 140 GHz, such as frequencies between about 60 GHz and 90 GHz, such as frequencies between about 7 GHz and 40 GHz. The microwave radio transmitter 200 transmits radio signals to a microwave radio receiver, such as microwave radio receiver 300 shown in FIG. 3. The microwave radio transmitter 200 receives also radio signals from a microwave radio receiver, such as polarization misalignment indications. The microwave radio transmitter 200 compensates for polarization misalignment, such as for angular misalignment between a polarization of an antenna of the transmitter 200 and a corresponding polarization of a receive antenna of a microwave radio receiver 300, such as antenna 321 shown in FIG. 3. An angular misalignment between two polarizations is a misalignment that results the transmit polarization and the receive polarization forming an angle in a plane perpendicular to the direction of communication. The angular misalignment can be compensated for by rotation of transmit signals in the digital domain by an angle in the plane perpendicular to the direction of communication. The microwave radio transmitter 200 comprises an antenna arrangement 220 and a baseband processing module 210 connected to the antenna arrangement 220. A connection 240 between the baseband processing module 210 and the antenna arrangement 220 is configured to be bidirectional in order to transmit adjusted transmit signals and to receive misalignment indications. For example, the baseband processing module 210 processes signals in a baseband part of the transmitter, i.e. around DC before a radio part (such as radio frequency, RF, front-end). The baseband processing module 210 processes signals in the digital domain for modulation, encoding, etc.

The antenna arrangement 220 comprises an antenna 221 having a polarization. According to some aspects, the antenna 221 is configured to transmit and/or receive signals. The antenna 221 has a polarization, i.e. an orientation of an electric field provided by the antenna 221 when excited. A polarization comprises for example a horizontal polarization, a vertical polarization. The polarization is considered horizontal if an absolute value of an angle between the polarization and a line of reference (for example a horizontal line of reference) takes on a value of 0 degrees+/−5%, or a value of 180 degrees+/−5%. The polarization is considered vertical if an absolute value of an angle between the polarization and a line of reference takes on a value of 90 degrees+/−5%, or a value of 270 degrees+/−5%. For example, when the line of reference is defined with respect to the Earth's surface, a horizontal polarization provides an electric field (substantially) parallel to the Earth's surface while a vertical polarization provides an electric field (substantially) perpendicular to the Earth's surface. However, according to some aspects, the line of reference is definable according to a referential system other than the Earth's surface. For example, the horizontal line of reference is defined as a line at an angle of 45 degrees+/−5% with respect to the Earth's surface. The line of reference used for detecting polarization misalignment at the receiver shall be the same as or aligned with the line of reference used at the transmitter.

According to some aspects, the antenna 221, 222 is configured to have a dual polarization, such as having a first polarization and a second polarization. For example, antenna 221, 22 is both polarized vertically and horizontally. Herein, such a dual-polarized antenna is herein taken as two separate but co-located antennas 221, 222 having respectively a first polarization and a second polarization.

Due to strong winds or other environmental factors, the antenna 221 in the microwave radio transmitter 200 or a receive antenna 321 comprised in the microwave radio receiver 300 is moved, rotated or tilted, possibly resulting in a polarization misalignment with the receive antenna at the microwave radio receiver 300. The polarization misalignment taken into consideration here is the polarization misalignment that takes place in a plane perpendicular to the direction of communication or propagation. To be able to correct the polarization misalignment, the baseband processing module 210 is configured to receive a polarization misalignment indication from the microwave radio receiver 300. The baseband processing module 210 receives a polarization misalignment indication via the antenna arrangement 220, such as via an antenna 221. The polarization misalignment indication is indicative of a misalignment between the polarization of the antenna 221 and a corresponding polarization of a receive antenna 321 comprised in the microwave radio receiver 300. The polarization misalignment indication comprises e.g. an angular misalignment estimate β (such as an angle having a positive or negative sign, and a value between 0 degrees and 180 degrees, formed between the polarization of the antenna 221 and the corresponding polarization of the receive antenna 321) and/or a misalignment presence indication, and/or a misalignment direction indicator. For example, the microwave radio transmitter 200 transmits at the same frequency and at the same time a first signal using a first polarization and a second signal using a second polarization. For example, the angular misalignment estimate β between the first polarization and the corresponding first polarization of the first receive antenna 321 can be seen as an estimate of an angle β between the transmit antenna orientation and the corresponding receive antenna orientation and a sign indicating a direction of the misalignment (e.g. clockwise, counterclockwise with respect to a reference). Alternatively or additionally, the polarization misalignment indication comprises an indication of presence of a misalignment (such as a binary indication: TRUE for indicating presence of misalignment, FALSE for indicating alignment), and/or a direction indicator indicative of the misalignment (such as a sign, e.g. "+" indicating the counterclockwise direction, "−" indicating the clockwise direction or vice versa). For example, the microwave radio transmitter 200 interprets a polarization misalignment indication "+1" as the presence of a polarization misalignment in the counterclockwise direction and compensates for the polarization misalignment by digitally rotating the transmit signals in the counterclockwise direction by a step (such as a step predetermined in an initialization phase).

The baseband processing module 210 is configured to compensate for polarization misalignment between the antenna 221 and the receive antenna 321 by adjusting the radio transmission based on the polarization misalignment indication. Hence, the baseband processing module 210 comprises a compensate module 211. For example, the baseband processing module 210 is configured to process and/or to precode a signal so as to remove or to mitigate the effect of polarization misalignment. Compensating for polarization misalignment at the microwave radio transmitter 200 is advantageous as any impairment due to the communication channel, such as fading, additive white noise, phase noise, and the like, cannot interfere with the compensation.

According to some aspects, the baseband processing module 210 is further configured to compensate for polarization misalignment by generating an output signal for radio transmission based on an input signal s1, s2 and the received polarization misalignment indication. Hence, according to some aspects, the compensate module 211 comprises a generator module 2111. For example, the generator module 2111 or the baseband processing module 210 is configured to multiply or mix the input signals s1, s2 by applying multiplication factors according to a rotation matrix based on the received polarization misalignment indication (i.e. based on the angular misalignment estimate β in this example). It is envisaged that the baseband processing module 210 computes the following output signals y1, y2:

$$\begin{pmatrix} y_1 \\ y_2 \end{pmatrix} = \begin{pmatrix} \cos(\beta) & -\sin(\beta) \\ \sin(\beta) & \cos(\beta) \end{pmatrix} \cdot \begin{pmatrix} s_1 \\ s_2 \end{pmatrix} \qquad (1)$$

In this example, the signals s1 and s2 are well aligned in time and phase, and the dependence on time s1($t$), s2($t$), has been omitted for brevity. The baseband processing module 210 provides then the resulting compensated signals to the antenna arrangement 220 for transmission. If the signals s1 and s2 are not aligned in time and phase, then the baseband processing module is configured to align the signals in time and phase.

According to some aspects, the antenna 221 is a first antenna 221 having a first polarization, and the antenna arrangement 220 further comprises a second antenna 222 having a second polarization. The first polarization is orthogonal, or near orthogonal, to the second polarization so as to minimize cross-polarization interference. For example, the first polarization is a vertical polarization while the second polarization is a horizontal polarization, or vice versa. According to some aspect, the first antenna 221 and the second antenna 222 form or act as a single dual-polarized antenna.

According to some aspects, the baseband processing module 210 is configured to receive from the microwave radio receiver 300 a polarization misalignment indication indicative of a misalignment between the second polarization and a corresponding polarization of a second receive antenna 322 comprised in the microwave radio receiver 300. The baseband processing module 210 receives, according to some aspects, a second polarization misalignment indication indicative of a misalignment between the second polarization and a corresponding polarization of a second receive antenna 322 and/or a first polarization misalignment indication indicative of a misalignment between the polarization of the first antenna 221 and a corresponding polarization of a first receive antenna 321. According to some aspects, the second polarization misalignment indication indicative of a misalignment between the second polarization and a corresponding polarization of a second receive antenna 322 is substantially equal to the first polarization misalignment indication. The baseband processing module 210 compensates for the polarization misalignment based on one of the received polarization misalignment indications. This further enables the microwave radio transmitter to process both polarization misalignment indications to e.g. average them out. The microwave radio transmitter is therefore able to derive an improved polarization misalignment indication. Furthermore, enabling the reception of two polarization misalignment indications provides robustness in case of a failure of one of the polarizations.

According to some aspects, the antenna arrangement 220 is configured to transmit a signal using at least one polarization to enable detection of the misalignment at the microwave radio receiver 300. To be able to detect the polarization misalignment at the microwave radio receiver 300, and thus to receive a polarization misalignment indication at the microwave radio transmitter 200, the microwave radio transmitter 200 has to transmit a signal to the microwave radio receiver 300 using at least one polarization of an antenna of the antenna arrangement 220. For example, the microwave radio transmitter 200 transmits a first signal to the microwave radio receiver 300 using the first polarization of an antenna 221. This way, the microwave radio receiver 300 receiving the signal can determine a polarization misalignment indication based on the received signal (e.g. by measuring received power on the non-intended polarization, by estimating cross-correlation between signals received on two polarizations).

According to some aspects, the antenna arrangement 220 comprises at least one mixing module 223, 224, such as a mixer associated with antenna 221. According to some aspects, the antenna arrangement 220 comprises a common oscillator 225 associated with the first antenna 221 and the second antenna 222. According to some aspects, the antenna arrangement 220 comprises an oscillator associated with each antenna 221, 222.

Figure 3:
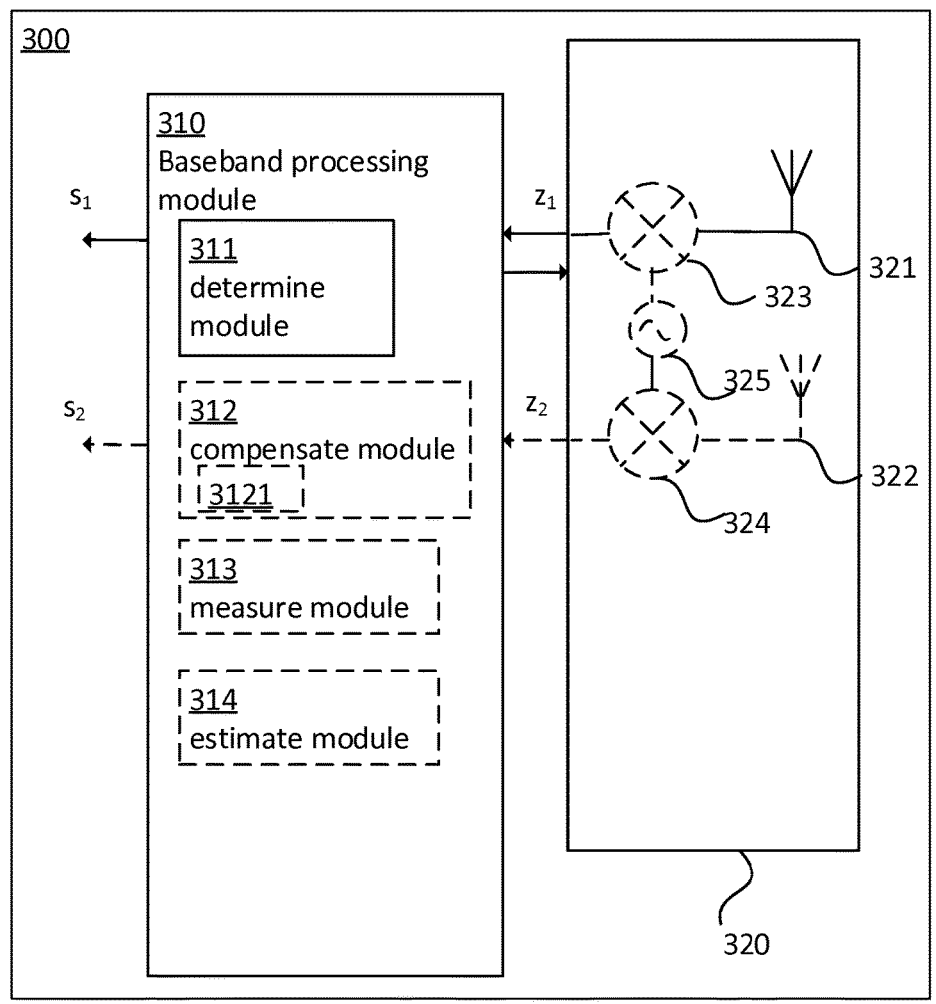
FIG. 3 is a block diagram illustrating a microwave radio receiver according to some aspects of the present disclosure.

FIG. 3 shows a microwave radio receiver 300 according to aspects of this disclosure. The microwave radio receiver 300 is configured for reception of a radio transmission from a microwave radio transmitter. The microwave radio receiver 300 operates in microwave frequencies, such as frequencies between 3 GHz and 140 GHz, such as frequencies between about 60 GHz and 90 GHz, such as frequencies between about 7 GHz and 40 GHz. The microwave radio receiver 300 comprises an antenna arrangement 320 and a baseband processing module 310 connected to the antenna arrangement 320. For example, the baseband processing module 310 processes signals in a baseband part of the receiver, i.e. around DC before a radio part (or radio frequency, RF, front-end) of the receiver 300. The baseband processing module 310 processes signals in the digital domain e.g. for demodulation, decoding, etc. The baseband processing module 310 comprises thus a digital baseband processing module.

The antenna arrangement 320 comprises an antenna 321 having a polarization. The antenna 321 is configured to receive a signal from the microwave radio transmitter, such as transmitter 200 shown in FIG. 2. Polarization refers to an orientation of an electric field provided by the antenna 321 when excited, for example due to the antenna structure. The polarization misalignment taken into consideration here is the polarization misalignment that is observed in a plane perpendicular to the direction of communication or propagation. A line of reference used for determining a polarization misalignment indication at the receiver 300 shall be the same as or aligned with the line of reference used at the transmitter 200. The signal is received using the polarization of antenna 321, which corresponds to (or is supposed to be aligned with) the polarization of the transmit antenna 221 of FIG. 2. For example, when the polarization used at the transmit antenna, such as antenna 221 of FIG. 2, is vertical, the signal is supposed to be received using the vertical polarization provided in the antenna arrangement 320. According to some aspects, the antenna 321, 322 is configured to have a dual polarization, such as having a first polarization and a second polarization. For example, antenna 321, 322 provide both a vertical polarization and a horizontal polarization.

The baseband processing module 310 is configured to determine a polarization misalignment indication based on the received signal. Hence, according to some aspects, the baseband processing module 310 comprises a determine module 311. The polarization misalignment indication is indicative of a misalignment between the polarization of the antenna 321 and a corresponding polarization of a transmit antenna 221 comprised in the microwave radio transmitter 200. For example, the antenna arrangement 320 provides a first polarization and a second polarization for reception of the radio transmission, the microwave radio receiver 300 receives at the same frequency and at the same time a first signal using the first polarization and a second signal using the second polarization. The microwave radio receiver 300 then determines the polarization misalignment indication based on the first signal and the second signal. The antenna arrangement 320 is configured to transmit the polarization misalignment indication to the microwave radio transmitter 200. According to some aspects, the baseband processing module 310 is configured to determine a polarization misalignment indication by measuring a received power on the second polarization for the signal received on the first polarization and by determining the polarization misalignment indication based on the measured received power. For example, the baseband processing module 310 is configured to determine a polarization misalignment indication by measuring a received power on the second antenna 322 for the signal received on the first antenna 321 by determining the polarization misalignment indication based on the measured received power. Hence, according to some aspects, the baseband processing module 310 comprises a measure module 313 and the determine module 311 is configured to determine the polarization misalignment indication based on the measured received power. In an illustrative example where the proposed technique is applied, the transmit antenna 221 and the receive antenna 321 are supposed to provide aligned polarizations but exhibit a polarization misalignment of e.g. 10 degrees counterclockwise. The microwave radio transmitter 200 (referred to as transmitter 200 in the remainder) transmits a signal on one polarization using for example antenna 221. The microwave radio receiver 300 receives (referred to as receiver 300 in the remainder) the signal on the corresponding polarization of antenna 321 and measures the received power on the other polarization of antenna 322, for which the radio transmission was not intended. The receiver 300 observes that the measured received power on the other polarization is higher than a first threshold (i.e. a power threshold for received power on the non-intended polarization) and responds with a polarization misalignment indication "−1" (i.e. an angular misalignment estimate of 1 degree clockwise) to support the transmitter 200 in compensating for the polarization misalignment. The transmitter 200 receives the polarization misalignment indication "−1" and proceeds to generate or adjust signals by rotating digitally of 1 degree clockwise, i.e. by applying multiplication factors according to the rotation matrix shown in Eq. 1 with β=−1. The transmitter 200 transmits the thus-adjusted signals to the receiver 300 on the same polarization as before. The receiver 300 measures again received signal power on the polarization of antenna 322 and notes that received signal power has decreased but not sufficiently. The receiver 300 responds again with a polarization misalignment indication "−1". The transmitter 200 repeats the above compensation by rotating the signals some more clockwise. Communication rounds between the transmitter 200 and the receiver 300 for compensation continue until the receiver 300 notes a decrease (below the first threshold) or does not note an increase in measured power, which shows polarization (near)alignment. When it is determined that polarization alignment is (nearly) reached, the receiver 300 thus responds with a polarization misalignment indication "0". The transmitter 200 does nothing in response to the "0" indication. This example shows how to correct the polarization misalignment incrementally by "1" degree here until alignment is achieved. Additionally or alternatively, the correction is achieved in a single round with an angle of "−10".

According to some aspects, the baseband processing module 310 is configured to determine a polarization misalignment indication by measuring a received power on the second polarization for the signal received by the first polarization and by determining the polarization misalignment indication based on the measured received power. For example, the transmit antenna 221 and the receive antenna 321 exhibit a polarization misalignment of e.g. 10 degrees counterclockwise. The microwave radio receiver 300 comprises an antenna arrangement 320 providing a first polarization and a second polarization. The microwave radio transmitter 200 (referred to as transmitter 200 in the remainder) transmits a signal on the first polarization. The microwave radio receiver 300 receives (referred to as receiver 300 in the remainder) the signal on the corresponding first polarization and measures the received power on the second polarization. The receiver 300 observes that the measured received power is higher than a first threshold and responds with a polarization misalignment indication "TRUE" (i.e. a misalignment presence indication) to support the transmitter 200 in compensating for the polarization misalignment. The transmitter 200 receives the polarization misalignment indication "TRUE" and proceeds to rotate digitally in the baseband processing module 210 the polarization from 1 degree to 360 degrees in steps, and at the same time generate thus-adjusted signals at each step. This is done by applying multiplication factors according to the rotation matrix shown in Eq. 1 with e.g. β{0, 1, . . . , 360} for a step of 1 degrees. The transmitter 200 transmits each thus-adjusted signal to the receiver 300 using the same polarization as before. The receiver 300 receives each signal on the corresponding first polarization and measures for each received signal the corresponding received power on the second polarization. The receiver 300 determines the encoded rotation value corresponding to the signal with the lowest measured received power and/or with the measured received power below the first threshold for not-intended polarization. The receiver 300 responds with a polarization misalignment indication comprising the determined rotation value. The transmitter 200 uses determined rotation value for pre-compensation on the subsequent signals.

According to some aspects, the baseband processing module 310 is configured to determine a polarization misalignment indication by measuring a received power for the signal received on the first polarization and by determining the polarization misalignment indication based on the measured received power. For example, the baseband processing module 310 is configured to determine a polarization misalignment indication by measuring a received power on the first antenna 321 by determining the polarization misalignment indication based on the measured received power. In an illustrative example where the proposed technique is applied, the transmit antenna 221 and the receive antenna 321 should provide aligned polarizations but exhibit a polarization misalignment of e.g. 10 degrees counterclockwise. The microwave radio transmitter 200 (referred to as transmitter 200, in the remainder) transmits a time-coded signal on one polarization. The microwave radio receiver 300 receives (referred to as receiver 300 in the remainder) the signal on the corresponding polarization and measures the received power on the corresponding polarization in this example. The receiver 300 observes that the measured received power is lower than a second threshold (i.e. a power threshold for received power on the intended polarization) and responds with a polarization misalignment indication "TRUE" (i.e. an misalignment presence indication=TRUE) to support the transmitter 200, in compensating for the polarization misalignment. The transmitter 200 receives the polarization misalignment indication "TRUE" and proceeds to rotate digitally in the baseband processing module 210 the polarization from 1 degree to 360 degrees in steps, and at the same time generate thus-rotated signals at each step. This is done by applying multiplication factors according to the rotation matrix shown in Eq. 1 with e.g. β={0, 1, . . . , 360} for a step of 1 degrees. The transmitter 200 transmits each thus-rotated signal to the receiver 300 using the same polarization as before. The receiver 300 measures again received power for each signal received and determines the encoded rotation value corresponding to the signal with the highest or maximum measured received power. The receiver 300 responds with a polarization misalignment indication comprising the determined rotation value. The transmitter 200 uses the determined rotation value for pre-compensation on the subsequent signals to be transmitted.

According to some aspects, the baseband processing module 310 is further configured to determine a polarization misalignment indication by estimating a cross-correlation between a first signal received on a first polarization and a second signal received on the second polarization and by determining the polarization misalignment indication based on the estimated cross-correlation. Here, the baseband processing module 310 comprises an estimate module 314 configured to estimate the cross-correlation and the determine module 311 is further configured to determine the polarization misalignment indication based on the estimated cross-correlation. In an illustrative example where the proposed technique is applied, the transmit antenna 221 and the receive antenna 321 should provide aligned polarizations but exhibit a polarization misalignment of e.g. 10 degrees counterclockwise. The microwave radio transmitter 200 (referred to as transmitter 200 in the remainder) transmits a signal on one polarization using antenna 221. The microwave radio receiver 300 comprises an antenna arrangement 320 providing a first polarization and a second polarization using antennas 321 and 322. The microwave radio transmitter 200 (referred to as transmitter 200 in the remainder) transmits the first signal on the first polarization and the second signal on the second polarization. The microwave radio receiver 300 receives (referred to as receiver 300 in the remainder) the first signal on the corresponding first polarization and the second signal on the corresponding second polarization. The receiver 300 determines a cross-correlation after first having time aligned signals on the two polarizations. The receiver 300 consults a pre-determined look-up table with the cross-correlation magnitude and sign, and responds with the corresponding polarization misalignment signal of −10 degrees. The transmitter 200 receives the polarization misalignment indication of "−10" and proceeds to rotate signals by 10 degrees clockwise by applying multiplication factors according to the rotation matrix shown in Eq. (1) with β=−10. The transmitter 200 transmits the thus-adjusted signals. The receiver 300 again determines cross-correlation based on the received signals on both polarizations and determines if alignment is acceptable (i.e. the cross-correlation result is below or equal to a cross-correlation threshold). If it is determined that the alignment is acceptable, the receiver 300 responds again with a "0" polarization misalignment indication. The transmitter 200 does nothing in response to the "0" polarization misalignment indication.

According to some aspects, the antenna 321 is a first antenna 321 having a first polarization and being configured to receive a first signal from the microwave radio transmitter 200, and the antenna arrangement 320 comprises a second antenna 322 having a second polarization and being configured to receive a second signal from the microwave radio transmitter 200. The first polarization is intended to be orthogonal to the second polarization so as to minimize cross-polarization interference. For example, the first polarization is a vertical polarization while the second polarization is a horizontal polarization, or vice versa. According to some aspects, antenna 321 and antenna 322 form and act as a single dual-polarized antenna.

According to some aspects, the baseband processing module 310 is further configured to estimate a cross-correlation between the first signal received on the first antenna 321 and the second signal received on the second antenna 322. Hence, the estimate module 314 is here configured to estimate a cross-correlation between the first signal received on the first antenna 321 and the second signal received on the second antenna 322. The baseband processing module 310 estimates a cross-correlation between the first signal and the second signal by de-mapping one of the signals, and estimating the cross-correlation between the de-mapped signal and the other signal. For example, the baseband processing module 310 de-maps the signal z1 received on the first antenna 321, and estimates the cross-correlation between the de-mapped signal and the signal z2 by multiplying each element of the de-mapped signal with a corresponding element of the signal z2 and averaging out the multiplication results to obtain the cross-correlation. The baseband processing module 310 is further configured to determine the polarization misalignment indication based on the estimated cross-correlation. For example, the baseband processing module 310 determines the polarization misalignment indication by comparing an absolute value of the estimated cross-correlation with a cross-correlation threshold and taking into account a sign or angle of the estimated cross-correlation. The estimated cross-correlation is for example in form of a complex number $C=Ae^{-i\beta}$ where A is the magnitude of the estimated cross-correlation and −β provides the sign and angle of the estimated cross-correlation. The sign or angle of the complex number obtained as the estimated cross-correlation indicates in which direction (e.g. clockwise, counter-clockwise) the polarization misalignment is to be compensated for. If the comparison results show that the absolute value of the estimated cross-correlation (i.e. the absolute value of the average result in this example) is below or equal to the cross-correlation threshold (i.e. the alignment is good), the baseband processing module 310 determines the polarization misalignment indication to be e.g. an angular estimate β=0, or a polarization misalignment presence indication "FALSE". If the comparison results show that the absolute value of the estimated cross-correlation (i.e. the absolute value of the average result in this example) is above the cross-correlation threshold, the baseband processing module 310 determines the polarization misalignment indication to be e.g. an angular estimate β equal to the angle of the complex number obtained as the estimated cross-correlation, a polarization misalignment presence indication "TRUE", and/or a misalignment direction indicator corresponding to the sign or angle of the complex number obtained as the estimated cross-correlation.

Alternatively or additionally, in order to determine the above-mentioned misalignment indication, the baseband processing module 310 is, according to some aspects, configured to receive the first signal on the first antenna 321 and the second signal received on the second antenna 322 and to determine a cross-correlation between the two signals, possibly after aligning the two signals in time. By correlating these two signals, the baseband processing module 310 obtains a cross-correlation between the two signals, possibly for one or more different time offsets between the two signals. This cross-correlation is indicative of polarization misalignment in that the magnitude of cross-correlation and one or more time offsets is indicative of the magnitude of polarization misalignment between the transmit antenna and the corresponding receive antenna. The sign of this cross-correlation is indicative of the angular direction in which compensation should be done at the transmitter to alleviate the polarization misalignment. Consequently, it is possible to determine the polarization misalignment indication from the magnitude and sign of the cross-correlation. The sign of the cross-correlation determines the sign of the polarization misalignment indication, and the magnitude of the cross-correlation determines the magnitude of the misalignment indication.

According to some aspects, the mapping between cross-correlation and misalignment indication is given by a predetermined table stored at the microwave radio receiver 300.

The microwave radio receiver 300 transmits the polarization misalignment indication to the microwave radio transmitter 200 so that the microwave radio transmitter 200 is able to compensate for the polarization misalignment. For example, the microwave radio transmitter 200 is able to compensate for the polarization misalignment by multiplying or mixing the input signals s1, s2 with multiplication factors according to a rotation matrix based on the received polarization misalignment indication as given in Eq. 1.

According to some aspects, the microwave radio receiver 300 transmits the polarization misalignment indication using a feedback channel over the air, but at a different frequency from the frequency used for the above mentioned radio transmission. According to some aspects, the antenna arrangement 320 transmits the polarization misalignment indication to the microwave radio transmitter 200 using one or both of the polarizations.

According to some aspects, compensation for polarization misalignment is performed at the microwave radio receiver 300. The baseband processing module 310 is configured to compensate for polarization misalignment between the polarization of the antenna 321 and the corresponding polarization of the transmit antenna 221 comprised in the microwave radio transmitter 200 (shown in FIG. 2) by adjusting the received signal based on the polarization misalignment indication. Hence, according to some aspects, the baseband processing module 310 comprises a compensate module 312. According to some aspects, the compensate module 312 comprises an adjust module 3121 configured to adjust the received signal based on the polarization misalignment indication. For example, the baseband processing module 310 is configured to adjust the received signal based on the polarization misalignment indication by applying multiplication factors to the received signal z1, z2 according to a rotation matrix based on the determined polarization misalignment indication (i.e. based on the angular misalignment estimate $\beta$ in this example). It is envisaged that the baseband processing module 310 computes the following signals s1, s2:

$$\begin{pmatrix} s_1 \\ s_2 \end{pmatrix} = \begin{pmatrix} \cos(\beta) & -\sin(\beta) \\ \sin(\beta) & \cos(\beta) \end{pmatrix} \cdot \begin{pmatrix} z_1 \\ z_2 \end{pmatrix} \quad (2)$$

In this example, the signals z1 and z2 are first aligned in time and phase, and the dependence on time $z1(t)$, $z2(t)$, has been omitted for brevity. If the signals z1 and z2 are not aligned in time and phase, then the baseband processing module is configured to align the signals in time and phase. Compensating for polarization misalignment at the microwave radio receiver 300 would involve handling any complexity created by impairments of the communication channel. It is thus more advantageous to perform the compensation for polarization misalignment at the microwave radio transmitter 200.

According to some aspects, the antenna arrangement 320 comprises a common oscillator 325 associated with antennas 321 and 322 and/or an oscillator associated with one antenna. The antenna arrangement 320 comprises, according to some aspects, a mixer module 323 associated with antenna 321 and a mixer module 324 associated with antenna 322.

According to some aspects, the baseband processing module 310 is further configured to iteratively determine the polarization misalignment indication and to compensate for the misalignment. For example, the baseband processing module 310 updates the polarization misalignment indication (e.g. the angular misalignment estimate $\beta$, and/or the misalignment presence indication, and/or the misalignment direction indicator) in the compensation described above until the measured signal indicates a satisfactory polarization alignment (i.e. a low received power on the non-intended polarization, a sufficiently high received power on the intended polarization and/or a low cross-correlation between signals received on different polarizations). According to some aspects, the baseband processing module 310 determines a satisfactory polarization misalignment indication by trying angle values between 0 and 360 degrees incrementally (as given in examples above), receiving the signals adjusted at the transmitter and determining the angle value which gives the lowest power in the non-intended polarization, the highest power on the intended polarization, and/or the lowest cross correlation between signals received on different polarizations.

Figure 4:
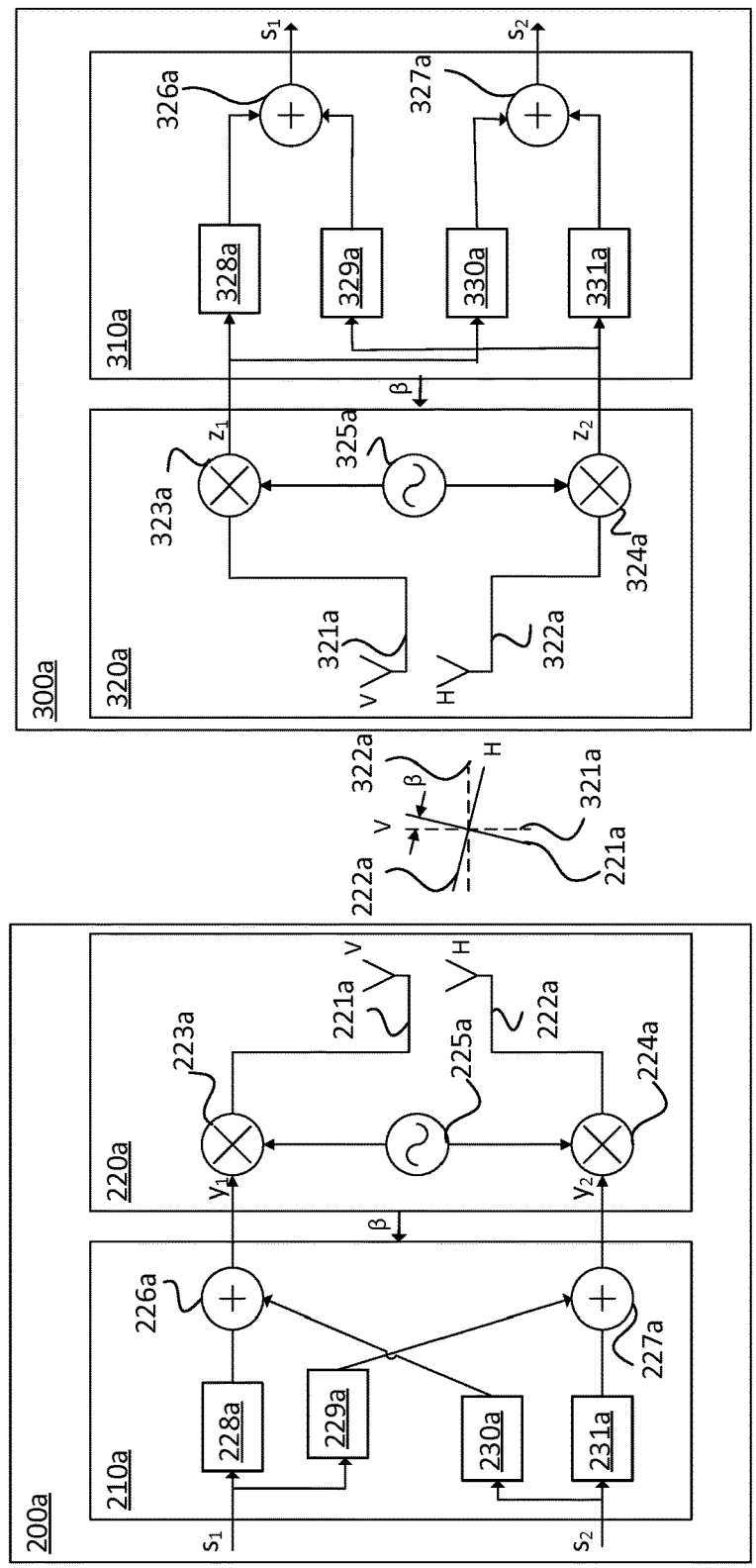
FIG. 4 is block diagrams illustrating a microwave radio transmitter according to some aspects of the present disclosure and a microwave radio receiver according to some aspects of the present disclosure.

FIG. 4 shows block diagrams illustrating a microwave radio transmitter 200a and a microwave radio receiver 300a according to some aspects of the present disclosure. FIG. 4 shows an illustrative example where the proposed technique is applied. The microwave radio transmitter 200a transmits on orthogonal polarizations to increase spectral efficiency. The microwave radio transmitter 200a comprises an antenna arrangement 220a and a baseband processing module 210a connected to the antenna arrangement 220a. The antenna arrangement 220a comprises an antenna 221 having a vertical polarization and an antenna 222a having a horizontal polarization. The antenna arrangement 220a comprises a common oscillator 225a associated with antennas 221a and 222a. The antenna arrangement 220a comprises a mixer module 223a associated with antenna 221a and a mixer module 224a associated with antenna 222a. The antenna arrangement 320a comprises an antenna 321a having a vertical polarization and an antenna 322a having a horizontal polarization. The antenna arrangement 320a comprises a common oscillator 325a associated with antennas 321a and 322a. The antenna arrangement 320a comprises a mixer module 323a associated with antenna 321a and a mixer module 324a associated with antenna 322a. In such settings, it is important that information does not leak between the polarizations due to incorrect antenna alignment (due to rotation) as this can reduce data throughput. The proposed technique is to compensate for an incorrect antenna rotation by modifying the two signals s1 and s2 (that go to the two antennas 221a, 222a) in the digital baseband domain at the transmitter 200a and/or at the receiver 300a. The transmitter 200a transmits signals to the receiver 300a using both polarizations. The receiver 300a receiving signals on both polarizations can then determine a polarization misalignment and estimate the polarization misalignment indication (e.g. an angle $\beta$, and/or a misalignment presence indication and/or a misalignment direction indicator) based on measured received power and/or on cross-correlation results. The receiver 300a sends the polarization misalignment indication (e.g. an angle $\beta$, and/or a misalignment presence indication and/or a misalignment direction indicator) to the transmitter 200a. At the transmitter 200a, the baseband processing module 210a obtains the polarization misalignment indication. The baseband processing module 210a comprises four 31s 228a, 229a, 230a, 231a and two combine modules 226a and 227a to pre-compensate for misalignment, i.e. to generate output signals by combining input signal s1 and input signal s2 with multiplication factors according to a rotation matrix based on the polarization misalignment indication e.g. as in Eq. 1. The adjust module 228a, 229a, 230a, 231a comprises e.g. a multiplier module, and/or an adaptive filter module. Adaptive filter modules are configured to mitigate any channel impairments (such as reflections of the radio signal, multi-path fading) as well as to compensate for polarization misalignment. Examples of adaptive filter modules comprise adaptive equalizer modules. Also, it is envisaged that the microwave radio receiver 300a uses the baseband processing module 310a, namely adjust modules 328a, 329a, 330a, 331a and combine modules 326a and 327a to (post-)compensate for polarization misalignment based the polarization misalignment indication that it has estimated. In an illustrative example where polarization misalignment compensation is performed at the microwave radio transmitter 200a and at the microwave radio receiver 300a, the transmit antenna 221a and the receive antenna 321a exhibit a polarization misalignment of e.g. 10 degrees counterclockwise. The microwave radio transmitter 200a (referred to as transmitter 200a in the remainder) transmits a signal on one polarization. The microwave radio receiver 300a receives (referred to as receiver 300a in the remainder) the signal on the corresponding polarization and measures the received power. The receiver 300a determines the polarization misalignment based e.g. the measured received power and/or the estimated cross-correlation. The receiver 300a compensates for the polarization misalignment by digitally rotating the received signal by "−10" degrees according to a rotation matrix, shown in Eq. (2) and responds with a polarization misalignment indication "−10" (i.e. an angular misalignment estimate of 10 degree clockwise) to support the transmitter 200a in compensating for the polarization misalignment. The transmitter 200a receives the polarization misalignment indication "−10" and proceeds to generate or adjust signals by rotating digitally in steps of 2 degrees clockwise, i.e. by applying multiplication factors according to the rotation matrix shown in Eq. 1 with $\beta=-2$. The transmitter 200a transmits the thus-adjusted signals to the receiver 300a on the same polarization as before. The receiver 300a measures again the polarization misalignment and notes that for example received signal power has increased but not sufficiently. The receiver 300a compensates for the polarization misalignment by digitally rotating the received signal by "−8" degrees according to a rotation matrix, shown in Eq. (2) and responds again with a polarization misalignment indication "−8". Upon reception of the polarization misalignment indication "−8", the transmitter 200a repeats the above compensation by rotating the signals some more clockwise. Communication or compensation rounds between the transmitter 200 and the receiver 300 for compensation continue until the receiver 300 notes a measured power and/or a cross-correlation, which shows polarization (near)alignment. When it is determined that polarization alignment is (nearly) reached, the receiver 300 thus does not need to compensate any longer for polarization misalignment and responds with a polarization misalignment indication "0". The transmitter 200 does nothing in response to the "0" indication.

Figure 5:
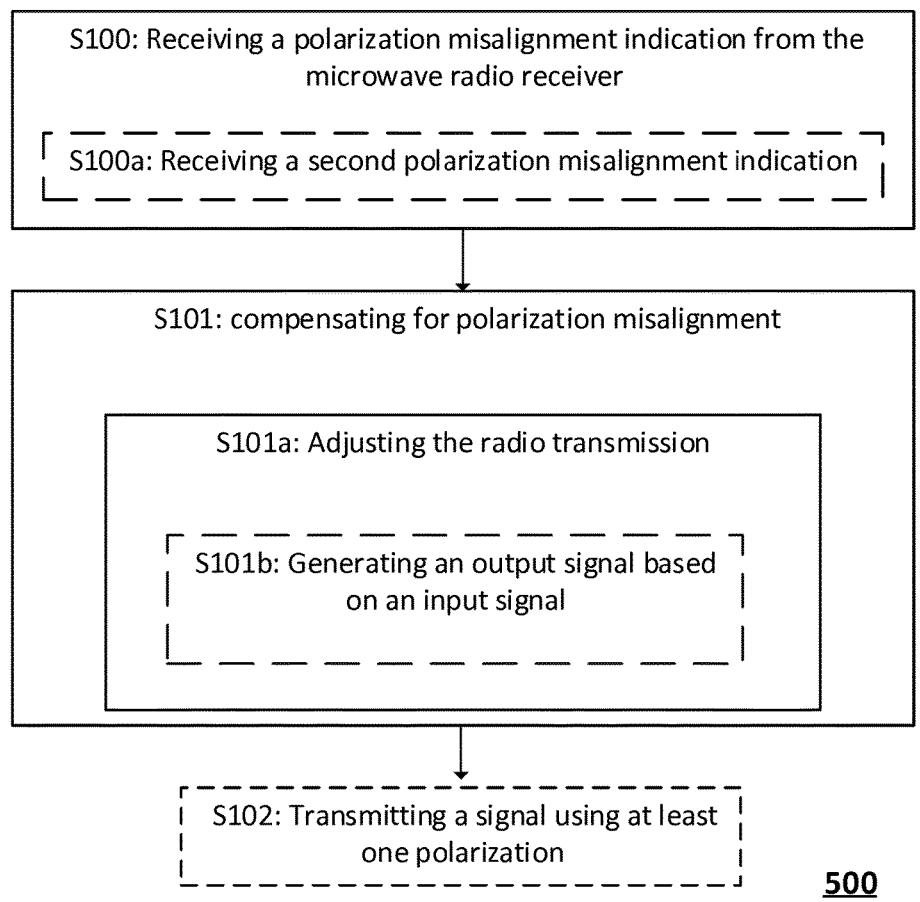
FIG. 5 is a flowchart illustrating methods performed at a microwave radio transmitter according to some aspects of this disclosure.

FIG. 5 shows a flowchart illustrating methods 500 performed at a microwave radio transmitter according to some aspects of this disclosure. The methods 500 are performed in a microwave radio transmitter, such as transmitter 200 of FIG. 2, for radio transmissions to a microwave radio receiver, such as receiver 300 of FIG. 3. The microwave radio transmitter 200 comprises an antenna arrangement 220 and a baseband processing module 210 connected to the antenna arrangement 220. The antenna arrangement 220 comprises an antenna 221 having a polarization. The method 500 comprises receiving S100 a polarization misalignment indication from the microwave radio receiver 300. Receiving S100 comprises according to some aspects receiving a polarization misalignment indication via the antenna arrangement 220, such as via an antenna 221. The polarization misalignment indication is indicative of a misalignment between the polarization and a corresponding polarization of a receive antenna 321 comprised in the microwave radio receiver 300. The method 500 comprises compensating S101 for polarization misalignment between the antenna 221 and the receive antenna 321 by adjusting S101a the radio transmission based on the polarization misalignment indication.

According to some aspects, the adjusting S101a comprises generating S101b an output signal based on an input signal s1, s2 and the received polarization misalignment indication. Compensating S101 comprises generating S101b an output signal based on an input signal s1, s2 and the received polarization misalignment indication. Generating S101b comprises according to some aspects processing and/or precoding a signal based on the received polarization misalignment indication so as to remove or to mitigate the effect of polarization misalignment. Compensating S101 comprises according to some aspects multiplying or mixing the input signals s1, s2 by applying multiplication factors according to a rotation matrix based on the determined polarization misalignment indication (e.g. with the angular misalignment estimate $\beta$, a misalignment presence indication, and/or a misalignment direction indicator). It is envisaged that compensating S101 comprises computing the output signals according to e.g. Eq. (1). In this example, the signals s1 and s2 are considered well aligned in time and phase. If the signals s1 and s2 are not aligned in time and phase, compensating S101 comprises e.g. aligning the signals in time and phase.

The resulting compensated signals are provided to the antenna arrangement 220 for transmission.

According to some aspects, the antenna 221 is a first antenna 221 having a first polarization, and the antenna arrangement 220 comprises a second antenna 222 having a second polarization. The receiving S100 comprises receiving S100a from the microwave radio receiver 300 a polarization misalignment indication indicative of a misalignment between the second polarization and a corresponding polarization of a second receive antenna 322 comprised in the microwave radio receiver 300. The receiving S100 comprises according to some aspects receiving S100a a second polarization misalignment indication indicative of a misalignment between the second polarization and a corresponding polarization of a second receive antenna 322 and/or a first polarization misalignment indication indicative of a misalignment between the polarization of the antenna 221 and a corresponding polarization of a receive antenna 321. Compensating S101 is then performed based on one of the received polarization misalignment indications.

According to some aspects, the method 500 further comprises transmitting S102 a signal using at least one polarization to enable detection of the misalignment at the microwave radio receiver 300. Transmitting S102 comprises here transmitting using one polarization of an antenna 221.

This way, the microwave radio receiver 300 receiving the signal can determine a polarization misalignment indication depending on which polarization signal is received on.

Figure 6:
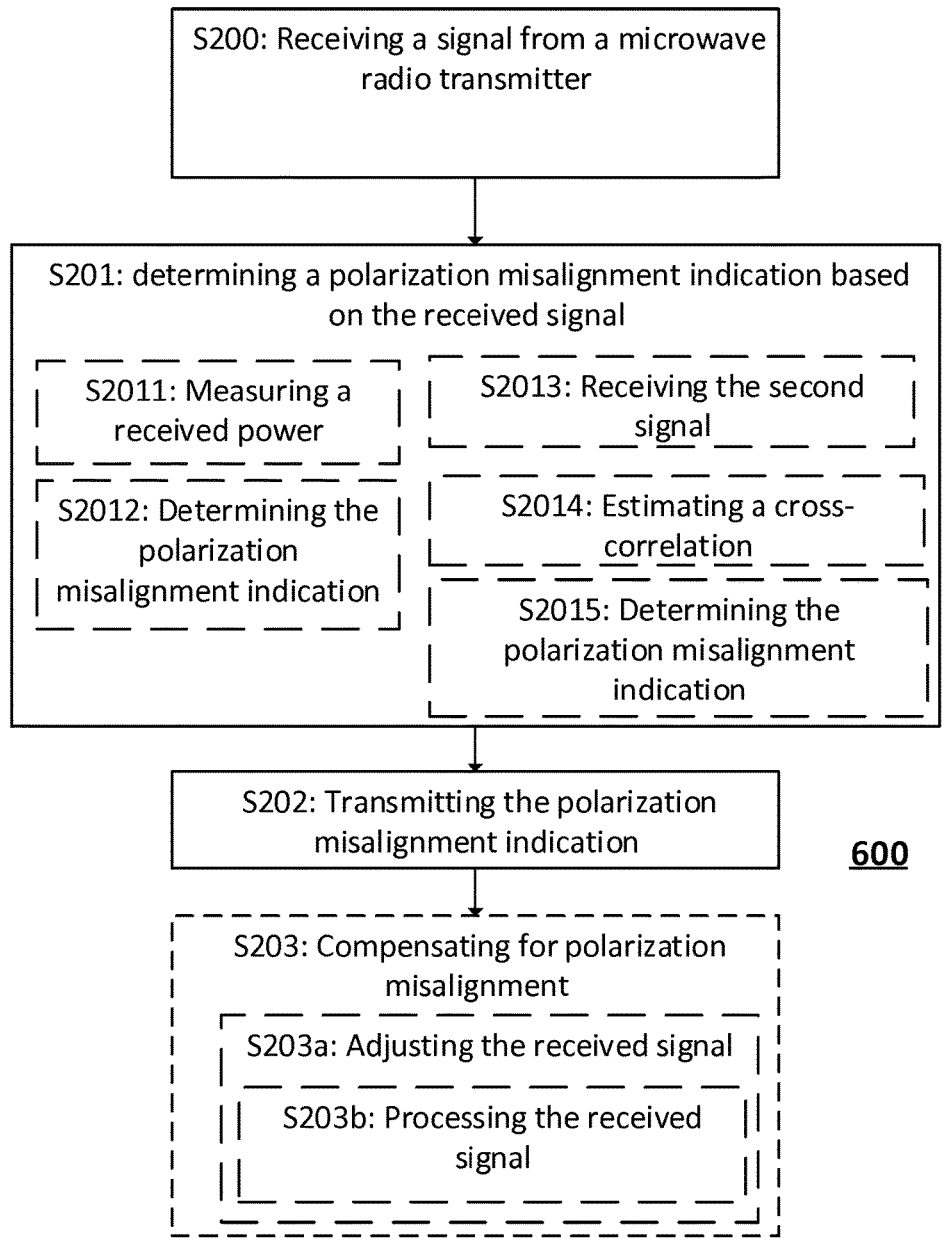
FIG. 6 is a flowchart illustrating methods performed at a microwave radio receiver according to some aspects of this disclosure.

FIG. 6 shows a flowchart illustrating methods 600 performed at a microwave radio receiver according to some aspects of this disclosure. The methods 600 are for reception of a radio transmission from a microwave radio transmitter, such as transmitter 200 of FIG. 2. The microwave radio receiver comprises an antenna arrangement 320 and a baseband processing module 310 connected to the antenna arrangement 320. The antenna arrangement 320 comprises an antenna 321 having a polarization. The method comprises receiving S200 a signal from a microwave radio transmitter 200 on the antenna 321.

Receiving S200 comprises here receiving the signal using a polarization of the antenna 321, corresponding to a polarization of a transmit antenna 221.

The method 600 further comprises determining S201 a polarization misalignment indication based on the received signal. The polarization misalignment indication being indicative of a misalignment between the polarization and a corresponding polarization of a transmit antenna 221 comprised in the microwave radio transmitter 200. According to some aspect, determining S201 comprises determining an angular polarization misalignment estimate β, (such as an angular misalignment between the transmit antenna 221 and the receive antenna 321) and/or a polarization misalignment presence indication, and/or a misalignment direction indicator.

The method 600 further comprises transmitting S202 the polarization misalignment indication to the microwave radio transmitter 200. Transmitting S202 comprises according to some aspects transmitting using the antenna arrangement 320, such as over a feedback channel. Transmitting S202 the polarization misalignment indication to the microwave radio transmitter 200 allows the microwave radio transmitter 200 to compensate for the polarization misalignment and thus simplifies the microwave radio receiver 300 that does not need then to perform any compensation.

According to some aspects, the method 600 further comprises compensating S203 for polarization misalignment between the antenna 321 and the transmit antenna 221 by adjusting S203a the received signal based on the polarization misalignment indication.

According to some aspects, the adjusting S203a comprises processing S203b the received signal using the polarization misalignment indication. Processing S203b comprises mixing the received signals using the polarization misalignment indication as for example indicated in FIG. 4 or in Eq. (2).

According to some aspects, the antenna 321 is a first antenna 321 having a first polarization and being configured to receive a first signal from the microwave radio transmitter 200. The antenna arrangement 320 comprises a second antenna 322 having a second polarization and being configured to receive a second signal from the microwave radio transmitter 200. The determining S201 comprises measuring S2011 a received power on the second polarization for the signal received on the first polarization, and determining S2012 the polarization misalignment indication based on the measured received power. For example, the microwave radio transmitter 200 transmits a signal using the first polarization only and measuring S2011 a received power is performed on the second polarization for the signal received on the first polarization. Determining S2012 comprises determining the polarization misalignment indication that provides a measured received power below a power threshold, and/or determining the polarization misalignment indication resulting in the lowest measured received power on the second antenna 322.

According to some aspects, determining S201 comprises measuring a received power for the signal received on the first polarization and determining the polarization misalignment indication based on the measured received power. For example, determining the polarization misalignment indication based on the measured received power comprising comparing the received power on the intended first polarization with a threshold and when the measured received power is lower than the threshold, it is determined that there is a polarization misalignment to be compensated for and/or to be transmitted.

According some aspects, in methods 600, the determining S201 comprises receiving S2013 the second signal on the second polarization; estimating S2014 a cross-correlation between the first signal received on the first polarization and the second signal received on the second polarization, and determining S2015 the polarization misalignment indication based on the estimated cross-correlation. For example, in methods 600, the determining S201 comprises receiving S2013 the second signal on the second antenna 322; estimating S2014 a cross-correlation between the first signal received on the first antenna 321 and the second signal received on the second antenna 322, and determining S2015 the polarization misalignment indication based on the estimated cross-correlation. Determining S2015 comprises e.g. determining the polarization misalignment indication based on an absolute value of the estimated cross-correlation, and indicating the sign of the estimated cross-correlation. The sign indicates which direction (e.g. clockwise, counterclockwise) the misalignment is to be compensated for. The determining S2015 comprises according to some aspects determining the polarization misalignment indication based on a comparison of an absolute value of the estimated cross-correlation with a cross-correlation threshold as well as indicating a sign of the estimated cross-correlation. Alternatively or additionally, the determining S2015 comprises according to some aspects determining the polarization misalignment indication providing the lowest estimated cross-correlation in absolute value.

According some aspects, the determining S201 and the compensating S203 are performed iteratively. For example, determining S201 iteratively comprises trying angle values between 0 and 360 degrees incrementally and determining the angle value which gives the lowest power in the "other polarization" or the lowest cross correlation.

Figure 7:
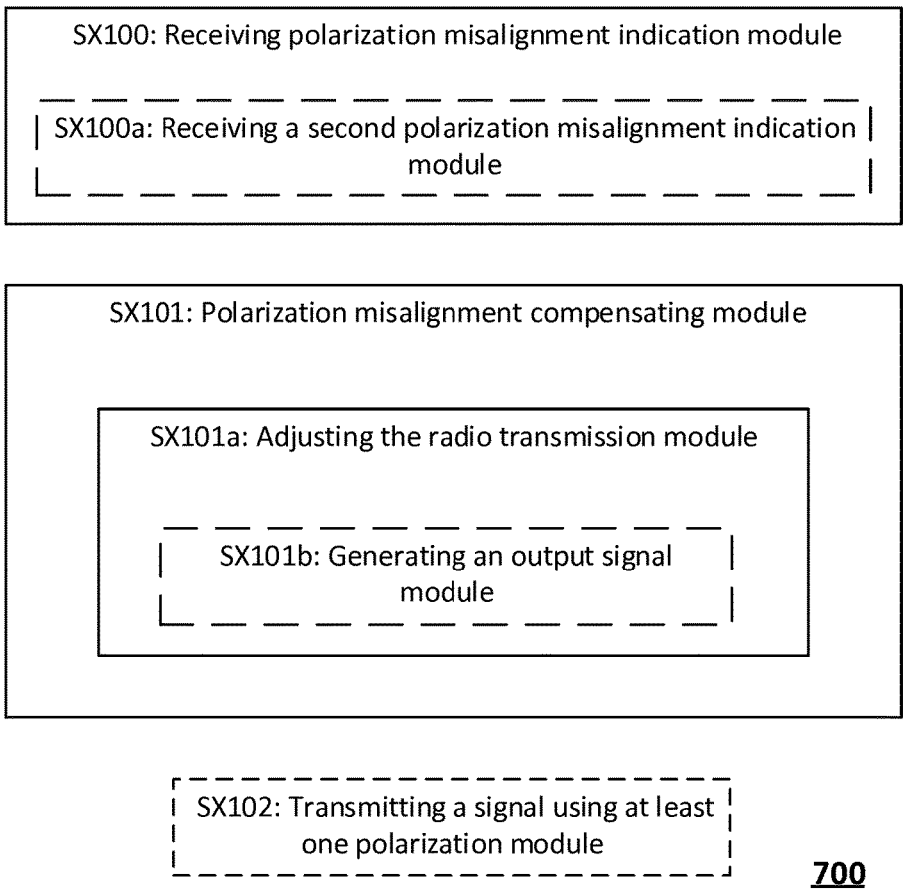
FIG. 7 is a block diagram illustrating a microwave radio transmitter according to some aspects of the present disclosure.

FIG. 7 is schematically illustrating aspects of a microwave radio transmitter configured to implement or realize at least some of the methods performed at the microwave radio transmitter. In particular, there is illustrated a microwave radio transmitter 700 configured for radio transmission to a microwave radio receiver. The microwave radio transmitter 700 comprises an antenna arrangement and a baseband processing module connected to the antenna arrangement. The antenna arrangement comprises an antenna having a polarization. The microwave radio transmitter 700 comprises a receiving polarization misalignment indication module SX100 configured to receive a polarization misalignment indication from the microwave radio receiver.

According to some aspects, the receiving polarization misalignment indication module SX100 comprises a receiving a second polarization misalignment indication module SX100a. The microwave radio transmitter 700 comprises a polarization misalignment compensating module SX101 configured to compensate for polarization misalignment between the antenna and a receive antenna of microwave radio receiver.

According to some aspects, the polarization misalignment compensating module SX101 comprises an adjusting the radio transmission module SX101a configured to adjust the radio transmission based on the received polarization misalignment indication. According to some aspects, the adjusting the radio transmission module SX101a comprises a generating an output signal module SX101b.

According to some aspects, the microwave radio transmitter 700 comprises a transmitting a signal using at least one polarization module SX102 configured to transmit a signal using at least one polarization to enable detection of the polarization misalignment at the microwave radio receiver.

FIG. 8 is schematically illustrating aspects of a microwave radio receiver 800 configured to implement or realize at least some of the methods performed at the microwave radio receiver. In particular, there is illustrated a microwave radio receiver 800 configured for reception of radio transmission from a microwave radio transmitter. The microwave radio receiver 800 comprises an antenna arrangement and a baseband processing module connected to the antenna arrangement. The antenna arrangement comprises an antenna having a polarization. The microwave radio receiver 800 comprises a receiving a signal module SX200 configured to receive a signal from a microwave radio transmitter. The microwave radio receiver 800 comprises a determining polarization misalignment indication module SX201 configured to determine a polarization misalignment indication based on the received signal. The polarization misalignment indication being indicative of a misalignment between the polarization of the antenna and a corresponding polarization of a transmit antenna comprised in the microwave radio transmitter.

According to some aspects, the antenna is a first antenna having a first polarization and the antenna arrangement comprises a second antenna having a second polarization and being configured to receive a signal from the microwave radio transmitter. According to some aspects, the determining polarization misalignment indication module SX201 comprises a measuring received power module SX2011 configured to measure a received power on the second polarization for the signal received on the first polarization, and a power-based determining polarization misalignment indication module SX2012 configured to determine the polarization misalignment indication based on the measured received power. According to some aspects, the determining polarization misalignment indication module SX201 comprises a receiving second signal module SX2013 configured to receive an second signal on the second polarization, an estimating cross-correlation module SX2014 configured to estimate a cross-correlation between a first signal received on the first polarization and the second signal; and a cross-correlation-based determining polarization misalignment indication module SX2015 configured to determine the polarization misalignment indication based on the estimated cross-correlation (such as based on a magnitude of the estimated cross-correlation and a sign of the estimated cross-correlation).

The microwave radio receiver 800 comprises a transmitting polarization misalignment indication module SX202 configured to transmit the polarization misalignment indication to the microwave radio transmitter.

According to some aspects, the microwave radio receiver 800 further comprises a polarization misalignment compensating module SX203 configured to compensate for polarization misalignment between the antenna and the transmit antenna. According to some aspects, the polarization misalignment compensating module SX203 comprises an adjusting the received signal module SX203a configured to adjust the received signal based on the polarization misalignment indication. According to some aspects, the adjusting the received signal module SX203a comprises a processing the received signal module SX203b configured to process the received signal using the polarization misalignment indication (e.g. using Eq. (2)).

This disclosure also relates to a computer program comprising computer program code which, when executed in a microwave radio transmitter 200, causes the microwave radio transmitter 200 to execute any of the steps of method 500 above.

This disclosure also relates to a computer program comprising computer program code which, when executed in a microwave radio receiver 300, causes the microwave radio receiver 300 to execute any of the steps of method 600 above.

It should be appreciated that FIGS. 1-8 comprises some modules or operations which are illustrated with a darker border and some modules or operations which are illustrated with a dashed border. The modules or operations which are comprised in a darker border are modules or operations which are comprised in the broadest example embodiment. The modules or operations which are comprised in a dashed border are example embodiments which may be comprised in, or a part of, or are further modules or further operations which may be taken in addition to the modules or operations of the darker border example embodiments. It should be appreciated that operations need not be performed in order. Furthermore, it should be appreciated that not all of the operations need to be performed. The example operations may be performed in any order and in any combination.

It should be appreciated that the example operations of FIGS. 5-6 may be performed simultaneously for any number of apparatuses.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A microwave radio transmitter for radio transmission to a microwave radio receiver, the microwave radio transmitter comprising:
an antenna arrangement comprising an antenna having a polarization;
a baseband processing circuitry connected to the antenna arrangement, the baseband processing circuitry being configured to:
receive a polarization misalignment indication from the microwave radio receiver, the polarization misalignment indication being indicative of a misalignment between the polarization of the antenna and a corresponding polarization of a receive antenna comprised in the microwave radio receiver; and
compensate for polarization misalignment between the antenna and the receive antenna by adjusting the radio transmission based on the polarization misalignment indication.

2. The microwave radio transmitter of claim 1, wherein the baseband processing circuitry is further configured to compensate for polarization misalignment by generating an output signal for radio transmission based on an input signal and the received polarization misalignment indication.

3. The microwave radio transmitter of claim 1, wherein the antenna is a first antenna having a first polarization, and wherein the antenna arrangement further comprises a second antenna having a second polarization.

4. The microwave radio transmitter of claim 3, wherein the baseband processing circuitry is configured to receive, from the microwave radio receiver, a polarization misalignment indication indicative of a misalignment between the second polarization and a corresponding polarization of a second receive antenna comprised in the microwave radio receiver.

5. The microwave radio transmitter of claim 1, wherein the antenna arrangement is configured to transmit a signal using the polarization to enable detection of the polarization misalignment at the microwave radio receiver.

6. A microwave radio receiver for reception of radio transmission from a microwave radio transmitter, the microwave radio receiver comprising:
an antenna arrangement comprising an antenna having a polarization;
a baseband processing circuitry connected to the antenna arrangement;
wherein the antenna is configured to receive a signal from the microwave radio transmitter;
wherein the baseband processing circuitry is configured to determine a polarization misalignment indication based on the received signal, the polarization misalignment indication being indicative of a misalignment between the polarization of the antenna and a corresponding polarization of a transmit antenna comprised in the microwave radio transmitter; and
wherein the antenna arrangement is configured to transmit the polarization misalignment indication to the microwave radio transmitter.

7. The microwave radio receiver of claim 6, wherein the baseband processing circuitry is configured to compensate for polarization misalignment between the polarization of the antenna and the corresponding polarization of the transmit antenna comprised in the microwave radio transmitter by adjusting the received signal based on the polarization misalignment indication.

8. The microwave radio receiver of claim 6:
wherein the antenna is a first antenna having a first polarization and configured to receive a first signal from the microwave radio transmitter; and wherein the antenna arrangement comprises a second antenna having a second polarization and configured to receive a second signal from the microwave radio transmitter.

9. The microwave radio receiver of claim 8, wherein the baseband processing circuitry is configured to:
measure a received power on the second polarization for the first signal received by the first polarization; and
determine the polarization misalignment indication based on the measured received power.

10. The microwave radio receiver of claim 8:
wherein the antenna arrangement is configured to receive the first signal on the first polarization and the second signal on the second polarization; and
wherein the baseband processing circuitry is configured to:
estimate a cross-correlation between the first signal and the second signal; and
determine the polarization misalignment indication based on the estimated cross-correlation.

11. The microwave radio receiver of claim 6, wherein the baseband processing circuitry is configured to iteratively determine the polarization misalignment indication and to compensate for the misalignment.

12. A network node, comprising:
a microwave radio transmitter for radio transmission to a microwave radio receiver, the microwave radio transmitter comprising:
an antenna arrangement comprising an antenna having a polarization; and
a baseband processing circuitry connected to the antenna arrangement, the baseband processing circuitry being configured to:
receive a polarization misalignment indication from the microwave radio receiver, the polarization misalignment indication being indicative of a misalignment between the polarization of the antenna and a corresponding polarization of a receive antenna comprised in the microwave radio receiver; and
compensate for polarization misalignment between the antenna and the receive antenna by adjusting the radio transmission based on the polarization misalignment indication.

13. A network node, comprising:
a microwave radio receiver for reception of radio transmission from a microwave radio transmitter, the microwave radio receiver comprising:
an antenna arrangement comprising an antenna having a polarization;
a baseband processing circuitry connected to the antenna arrangement;
wherein the antenna is configured to receive a signal from the microwave radio transmitter;
wherein the baseband processing circuitry is configured to determine a polarization misalignment indication based on the received signal, the polarization misalignment indication being indicative of a misalignment between the polarization of the antenna and a corresponding polarization of a transmit antenna comprised in the microwave radio transmitter; and
wherein the antenna arrangement is configured to transmit the polarization misalignment indication to the microwave radio transmitter.

14. A method, performed in a microwave radio transmitter, for radio transmissions to a microwave radio receiver, the microwave radio transmitter comprising an antenna arrangement and a baseband processing circuitry connected to the antenna arrangement, the antenna arrangement comprising an antenna having a polarization; the method comprising:
receiving a polarization misalignment indication from the microwave radio receiver, the polarization misalignment indication being indicative of a misalignment between the polarization and a corresponding polarization of a receive antenna comprised in the microwave radio receiver; and
compensating for polarization misalignment between the antenna and the receive antenna by adjusting the radio transmission based on the polarization misalignment indication.

15. The method of claim 14, wherein the adjusting comprises generating an output signal based on an input signal and the received polarization misalignment indication.

16. The method of claim 14:
wherein the antenna is a first antenna having a first polarization;
wherein the antenna arrangement comprises a second antenna having a second polarization; and
wherein the receiving comprises receiving from the microwave radio receiver a polarization misalignment indication indicative of a misalignment between the second polarization and a corresponding polarization of a second receive antenna comprised in the microwave radio receiver.

17. The method of claim 14, further comprising transmitting a signal using at least one polarization to enable detection of the misalignment at the microwave radio receiver.

18. A method, performed in a microwave radio receiver, for reception of radio transmission from a microwave radio transmitter, the microwave radio receiver comprising an antenna arrangement and a baseband processing circuitry connected to the antenna arrangement, the antenna arrangement comprising an antenna having a polarization, the method comprising:
receiving a signal from a microwave radio transmitter on the antenna;
determining a polarization misalignment indication based on the received signal, the polarization misalignment indication being indicative of a misalignment between the polarization and a corresponding polarization of a transmit antenna comprised in the microwave radio transmitter; and
transmitting the polarization misalignment indication to the microwave radio transmitter.

19. The method of claim 18, further comprising compensating for polarization misalignment between the antenna and the transmit antenna by adjusting the received signal based on the polarization misalignment indication.

20. The method of claim 19, wherein the adjusting comprises processing the received signal using the polarization misalignment indication.

21. The method of claim 19, wherein the determining and the compensating are performed iteratively.

22. The method of claim 18:
wherein the antenna is a first antenna having a first polarization and configured to receive a first signal from the microwave radio transmitter;
wherein the antenna arrangement comprises a second antenna having a second polarization and configured to receive a second signal from the microwave radio transmitter; and
wherein the determining comprises:

measuring a received power on the second polarization for the first signal received on the first polarization; and determining the polarization misalignment indication based on the measured received power.

23. The method of claim 18:

wherein the antenna is a first antenna having a first polarization and configured to receive a first signal from the microwave radio transmitter;

wherein the antenna arrangement comprises a second antenna having a second polarization and configured to receive a second signal from the microwave radio transmitter; and wherein the determining comprises:

receiving the second signal on the second polarization;

estimating a cross-correlation between the first signal and the second signal; and determining the polarization misalignment indication based on the estimated cross-correlation.

24. A non-transitory computer readable recording medium storing a computer program product for controlling radio transmissions from a microwave radio transmitter to a microwave radio receiver, the microwave radio transmitter comprising an antenna arrangement and a baseband processing circuitry connected to the antenna arrangement, the antenna arrangement comprising an antenna having a polarization; the computer program product comprising software instructions which, when run on the processing circuitry, causes the microwave radio transmitter to:

receive a polarization misalignment indication from the microwave radio receiver, the polarization misalignment indication being indicative of a misalignment between the polarization and a corresponding polarization of a receive antenna comprised in the microwave radio receiver; and compensate for polarization misalignment between the antenna and the receive antenna by adjusting the radio transmission based on the polarization misalignment indication.

25. A non-transitory computer readable recording medium storing a computer program product for controlling reception of radio transmission from a microwave radio transmitter to a microwave radio receiver, the microwave radio receiver comprising an antenna arrangement and a baseband processing circuitry connected to the antenna arrangement, the antenna arrangement comprising an antenna having a polarization, the computer program product comprising software instructions which, when run on the processing circuitry, causes the microwave radio receiver to:

receive a signal from a microwave radio transmitter on the antenna;

determine a polarization misalignment indication based on the received signal, the polarization misalignment indication being indicative of a misalignment between the polarization and a corresponding polarization of a transmit antenna comprised in the microwave radio transmitter; and transmit the polarization misalignment indication to the microwave radio transmitter.

\* \* \* \* \*